United States Patent
Zhang et al.

(10) Patent No.: US 11,223,477 B2
(45) Date of Patent: Jan. 11, 2022

(54) DATA SHARING METHOD, CLIENT, SERVER, COMPUTING DEVICE, AND STORAGE MEDIUM

(71) Applicant: TENCENT TECHNOLOGY (SHENZHEN) COMPANY LIMITED, Guangdong (CN)

(72) Inventors: Jian Jun Zhang, Shenzhen (CN); Wen Wei Zou, Shenzhen (CN); Mao Cai Li, Shenzhen (CN); Zi Chao Tang, Shenzhen (CN); Jun Zang, Shenzhen (CN); Qing Zheng Shang, Shenzhen (CN); Zong You Wang, Shenzhen (CN); Qing Qin, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 189 days.

(21) Appl. No.: 16/683,597

(22) Filed: Nov. 14, 2019

(65) Prior Publication Data
US 2020/0084037 A1    Mar. 12, 2020

Related U.S. Application Data

(63) Continuation of application No. PCT/CN2018/107962, filed on Sep. 27, 2018.

(30) Foreign Application Priority Data

Nov. 2, 2017    (CN) .......................... 201711065783.1

(51) Int. Cl.
*H04L 9/32*    (2006.01)
*H04L 9/08*    (2006.01)
*H04L 29/06*    (2006.01)

(52) U.S. Cl.
CPC .......... *H04L 9/3226* (2013.01); *H04L 9/0819* (2013.01); *H04L 9/0861* (2013.01); *H04L 63/0428* (2013.01); *H04L 2209/38* (2013.01)

(58) Field of Classification Search
CPC . G06F 21/6209; H04L 9/3239; H04L 9/3226; H04L 9/0861; H04L 9/0894;
(Continued)

(56) References Cited

U.S. PATENT DOCUMENTS 8,464,353 B2 *    6/2013  Thomas ............. H04L 63/0428
                                                      726/27
9,171,298 B2 *   10/2015  Atkinson ................ H04L 63/08
(Continued)

FOREIGN PATENT DOCUMENTS

CN    103442059 A    12/2013
CN    103561034 A     2/2014
(Continued)

OTHER PUBLICATIONS

Chinese Office Action issued in CN 201711065783.1 dated Aug. 7, 2019.
(Continued)

*Primary Examiner* — Amare F Tabor
(74) *Attorney, Agent, or Firm* — Sughrue Mion, PLLC

(57) ABSTRACT

A data sharing method, server and storage medium including receiving a first part of a first key from a first client, the first key corresponding to encrypted data uploaded to a block of an information sharing system generating a first authorization code corresponding to the encrypted data; transmitting the first authorization code to the first client; based on receiving an access request from a second client for the encrypted data, obtaining a second authorization code and an incomplete key from the access request; based on the second authorization code being the same as the first autho-
(Continued)

rization code and the second authorization code being valid, generating a second key according to the incomplete key and the first part of the first key corresponding to the encrypted data decrypting the encrypted data according to the second key to obtain the plaintext data; and transmitting, to the second client, the decrypted plaintext data.

20 Claims, 8 Drawing Sheets

(58) Field of Classification Search
CPC ....... H04L 9/0819; H04L 9/085; H04L 63/10; H04L 63/0428; H04L 2209/38
USPC .......................................................... 713/153
See application file for complete search history.

(56) References Cited

U.S. PATENT DOCUMENTS

| | | | |
|---|---|---|---|
| 9,769,664 B1* | 9/2017 | Kavaler | ............... H04L 63/0428 |
| 10,137,860 B2* | 11/2018 | Zielinski | ............... H04L 9/0618 |
| 2008/0095375 A1 | 4/2008 | Tateoka et al. | |
| 2016/0379220 A1* | 12/2016 | Tunnell | ............... H04L 63/0869 |
| | | | 705/71 |
| 2017/0118183 A1 | 4/2017 | Shin et al. | |
| 2017/0177898 A1 | 6/2017 | Dillenberger | |
| 2018/0276668 A1 | 9/2018 | Li | |
| 2020/0235922 A1* | 7/2020 | Minner | ................. H04L 9/0861 |

FOREIGN PATENT DOCUMENTS

| | | |
|---|---|---|
| CN | 103973736 A | 8/2014 |
| CN | 104980477 A | 10/2015 |
| CN | 106612275 A | 5/2017 |
| CN | 107196900 A | 9/2017 |
| JP | 2007089098 A | 4/2007 |
| JP | 2008103936 A | 5/2008 |
| JP | 2017195627 A | 10/2017 |

OTHER PUBLICATIONS

International Search Report of PCT/CN2018/107962 dated Dec. 13, 2018.
Written Opinion of PCT/CN2018/107962 dated Dec. 13, 2018.
Office Action dated Aug. 31, 2020, from the Korean Intellectual Property Office in Application No. 10-2019-7034696.
Communication dated Jun. 29, 2021, from the Japanese Patent Office in application No. 2020-524318.
Written Opinion of the International Searching Authority dated Dec. 13, 2018, in international application No. PCT/CN2018/107962.

* cited by examiner

DATA SHARING METHOD, CLIENT, SERVER, COMPUTING DEVICE, AND STORAGE MEDIUM

CROSS-REFERENCE TO RELATED APPLICATIONS

This application is a continuation of International Patent Application No. PCT/CN2018/107962 filed on Sep. 27, 2018, which claims priority from China Patent Application No. 201711065783.1, filed in the Chinese Patent Office on Nov. 2, 2017 and entitled "DATA SHARING METHOD, CLIENT, SERVER, COMPUTING DEVICE, AND STORAGE MEDIUM," which are incorporated herein by reference in their entireties.

BACKGROUND

1. Field

Embodiments of the present disclosure relate to the field of computer technologies, and in particular, to a data sharing method, a client, a server, a computing device, and a storage medium.

2. Description of Related Art

With the development of the Internet technology, new information sharing systems make a debut into the field. A user may upload data, such as pictures, documents, videos, and other files, to the information sharing systems, and authorize other users to access the data through the information sharing systems.

Therefore, there is a need for the information sharing systems requiring technical means to ensure the security of the data, for example, verifying information provided by a user when the user requests to access a file.

SUMMARY

According to an embodiment, there is a data sharing method, performed by an access authorization server. The method may include receiving a first part of a first key from a first client, the first key corresponding to encrypted data uploaded to a block of an information sharing system, the encrypted data being obtained by encrypting a piece of plaintext data according to the first key, and the information sharing system being a blockchain system; generating a first authorization code corresponding to the encrypted data; transmitting the first authorization code to the first client; based on receiving an access request from a second client for the encrypted data, obtaining a second authorization code and an incomplete key from the access request; based on the second authorization code being the same as the first authorization code and the second authorization code being valid, generating a second key according to the incomplete key and the first part of the first key corresponding to the encrypted data, the generated second key being the same as the first key and the incomplete key being the same as the second part of the first key; obtaining the encrypted data from the block of the information sharing system; decrypting the encrypted data according to the second key to obtain the plaintext data; and transmitting, to the second client, the decrypted plaintext data.

According to another embodiment, there is an access authorization server, including at least one memory configured to store computer program code; and at least one processor configured to access the computer program code and operate as instructed by the computer program code. The computer program code may include authorization code configured to cause the at least one processor to receive a first part of a first key from a first client, the first key corresponding to encrypted data uploaded to a block of an information sharing system, the encrypted data being obtained by encrypting a piece of plaintext data according to the first key, and the information sharing system being a blockchain system, generate a first authorization code corresponding to the encrypted data, and transmit the first authorization code to the first client; verification code configured to, based on receiving an access request from a second client for the encrypted data, obtain a second authorization code and an incomplete key from the access request; key code configured to cause the at least one processor to, based on the second authorization code being the same as the first authorization code and the second authorization code being valid, generate a second key according to the incomplete key and the first part of the first key corresponding to the encrypted data, the generated second key being the same as the first key and the incomplete key being the same as the second part of the first key; and decryption code configured to cause the at least one processor to obtain the encrypted data from the block of the information sharing system, decrypt the encrypted data according to the second key to obtain the plaintext data, and transmit, to the second client, the decrypted plaintext data.

According to another embodiment, there is a non-transitory computer readable storage medium, storing executable instructions, the executable instructions capable of causing a computer to receive a first part of a first key from a first client, the first key corresponding to encrypted data uploaded to a block of an information sharing system, the encrypted data being obtained by encrypting a piece of plaintext data according to the first key, and the information sharing system being a blockchain system; generate a first authorization code corresponding to the encrypted data; transmit the first authorization code to the first client; based on receiving an access request from a second client for the encrypted data, obtain a second authorization code and an incomplete key from the access request; based on the second authorization code being the same as the first authorization code and the second authorization code being valid, generate a second key according to the incomplete key and the first part of the first key corresponding to the encrypted data, the generated second key being the same as the first key and the incomplete key being the same as the second part of the first key; obtain the encrypted data from the block of the information sharing system; decrypt the encrypted data according to the second key to obtain the plaintext data; and transmit, to the second client, the decrypted plaintext data.

BRIEF DESCRIPTION OF THE DRAWINGS

To describe the technical solutions in the embodiments of the present disclosure more clearly, the accompanying drawings are provided for further understanding of the present disclosure. The accompanying drawings in the description only show some embodiments of the present disclosure, and a person of ordinary skill in the art may derive other embodiments from these accompanying drawings without creative efforts.

DESCRIPTION

To make the description concise and intuitive, the solutions of the present disclosure are illustrated herein by describing several representative embodiments. However, not all implementations are shown herein. Numerous details in the embodiments are merely used for helping understanding of the solutions of the present disclosure, and the technical solutions of the present disclosure may not be limited to these details during implementation. To avoid unnecessarily obscuring the solutions of the present disclosure, some implementations are not described in detail, but only a framework is provided.

Figure 1:
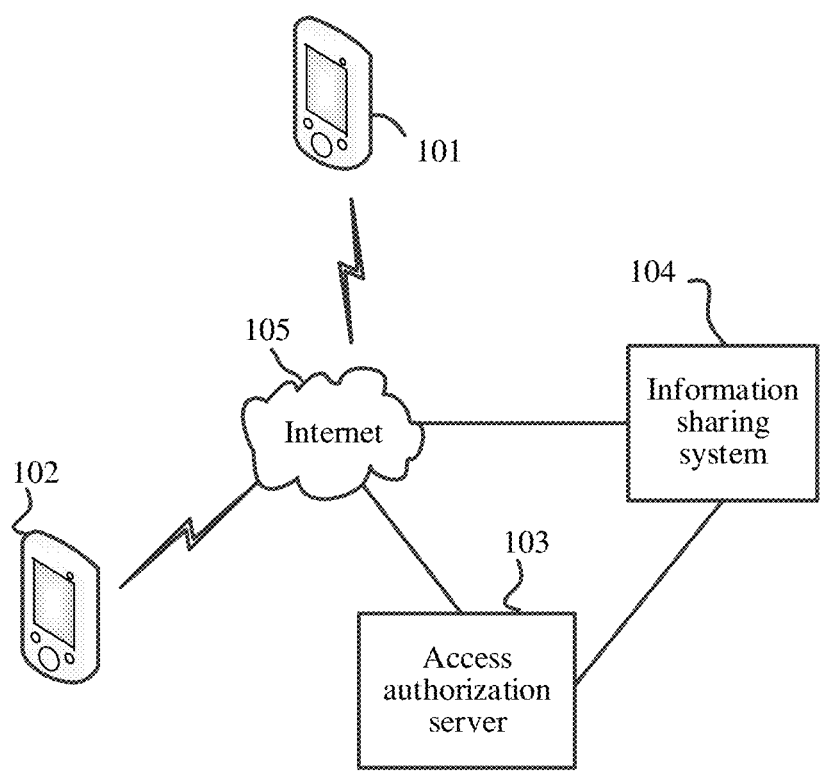
FIG. 1 is a diagram of a system architecture according to an embodiment.

An embodiment of the present disclosure provides a data sharing method. The method may be applied to the system architecture shown in FIG. 1. As shown in FIG. 1, the system architecture may include a first client 101, a second client 102, an access authorization server 103, and an information sharing system 104. The entities may communicate through the Internet 105. The information sharing system 104 may be configured to store various data uploaded by a user, and the user may also access data in the information sharing system 104. An actual network may include a large quantity of clients, but not limited to clients 101 and 102. A piece of data uploaded to the information sharing system 104 may correspond to data transmitted from a first client 101, which may be a client used by a user who uploads the data, and may be also referred to as a sharer client. This piece of data may be accessed by one or more second clients 102. The second client 102 may be a client used by a user who accesses this piece of data, and may be also referred to as a visitor client or a viewer client. The access authorization server 103 may be directly connected to the information sharing system 104 or connected to the information sharing system 104 through the Internet 105, and may be configured to provide an access service or an authorized viewing service of the information sharing system 104. The second client 102 may obtain desired data from the information sharing system 104 through the access authorization server 103. Specifically, the second client 102 may transmit an access request or a viewing request for a piece of data to the access authorization server 103. The access authorization server 103 authenticates the access request by verifying whether a user of the second client 102 has a right to access the piece of data, for example, verifying an authorization code in the access request. In a case that the authentication succeeds, encrypted data obtained from the information sharing system 104 may be decrypted according to key information carried in the access request. If plaintext data after decryption is obtained successfully, the plaintext data may be returned to the second client 102.

Here, the first client 101 and the second client 102 may be various APP clients or browsers that may access shared data. The first client 101 and the second client 102 may run on various terminal devices and may include a PC, a mobile phone, a tablet computer, a palmtop computer, an ultrabook, a wearable device, and the like. The information sharing system 104 may be various integrated or distributed data storage systems and may include, but are not limited to, a blockchain system, a database system, a network disk/cloud disk system, and the like. Data stored in the information sharing system 104 may include data generated in multiple service scenarios, including digital assets, an authentication service, a distributed ledger, sharing economy, and other scenarios.

The digital assets refer to non-currency assets that are owned or controlled by enterprises, existing in a form of electronic data, and may be held for sale in daily activities or used in a production process. The production of the digital assets may benefit from office automation. The digital assets are developed based on an electronic payment system, and may be used for scenarios, such as shared credits, coupons, digital currencies, registration of shares, and other scenarios. The authentication service is used for business scenarios, such as copyright/ownership projection, judicial document projection, charitable donations, and personal and enterprise certificates. The shared ledger is used for business scenarios, such as inter-agency clearing, bank factoring, inter-agency syndicated loans, supply chain financing, and cross-border remittance. The blockchain is a link data structure formed by connecting data blocks sequentially in a chronological order, and is a tamper-resistant and forgery-resistant distributed ledger ensured by means of cryptography. The blockchain system is a brand-new distributed basic architecture, which verifies and stores data by using a link data structure, generates and updates data by using a distributed node consensus algorithm, ensures security of data transmission and access by means of cryptography, and programs and operates data by using a smart contract formed by automated script code.

In some business scenarios, data uploaded to the information sharing system 104 may need to be encrypted, and access to the data may need to be authorized. In other words, some data may be shared conditionally, and such data may be referred to as private data of a user, for example, real-name authentication information of an individual or an agency, financial account information, a photo album, an original work, and information requiring sharing authentication. Some users may want to share such data without making the content public so that the data is shared among particular users. Therefore, the data may be encrypted and stored in the information sharing system 104, and then a specific user may be authorized to view the data.

Figure 2:
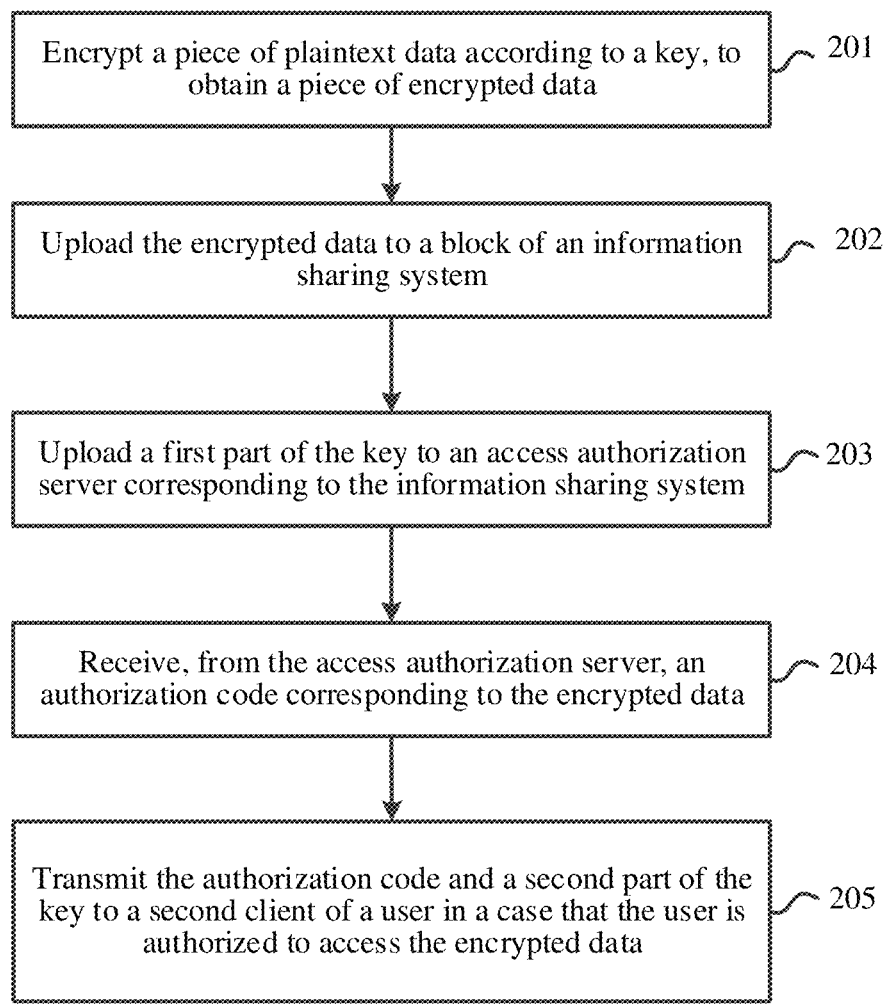
FIG. 2 is a flowchart of a method according to an embodiment.
Figure 3:
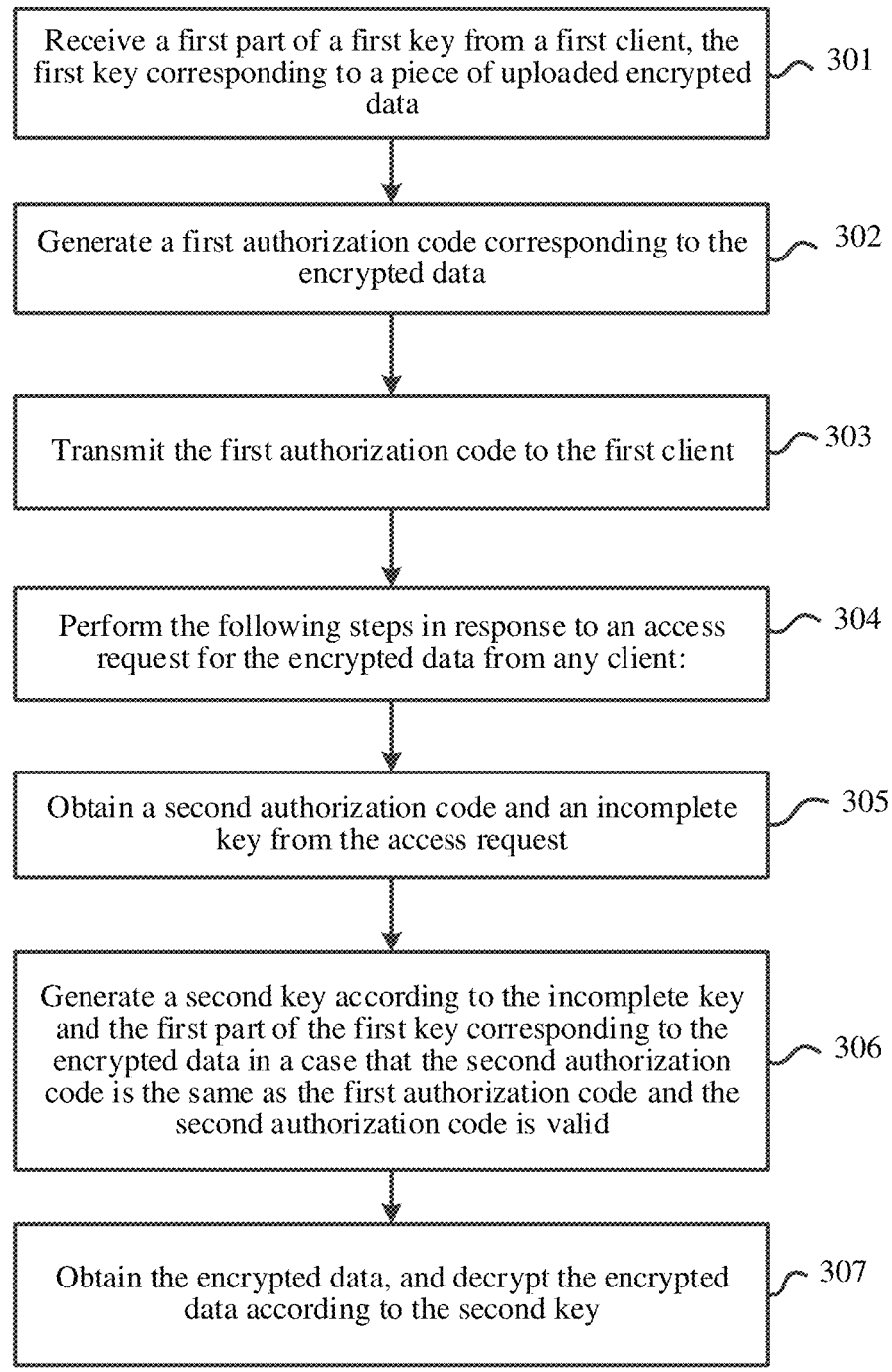
FIG. 3 is a flowchart of another method according to an embodiment.

According to an embodiment, there is provided a data sharing method, which may be performed by a terminal device of a first client 101. FIG. 1 only shows one first client 101, and in an actual application scenario, there may be multiple first clients 101. Each first client 101 may implement the method described herein. Referring to FIG. 2, the method may include the following steps:

In step 201, a first client 101 may encrypt a piece of plaintext data according to a key to obtain a piece of encrypted data.

In step 202, the first client 101 may upload the encrypted data to a block of an information sharing system 104, the information sharing system being a blockchain system.

Here, when a user wants to upload a piece of data, a first client 101 used by the user encrypts the piece of data by using a preset key, and then uploads the encrypted data to the information sharing system 104.

In step 203, the first client 101 may upload a first part of the key to an access authorization server 103 corresponding to the information sharing system 104.

Here, the access authorization server 103 corresponding to the information sharing system 104 may refer to the access authorization server 103 connected to the information sharing system 104.

Here, the key may be a character string, and the character string used as the key may be divided into two character strings that are used as a first part and a second part of the key, respectively. In this step, the first part of the key may be uploaded to the access authorization server 103. In some embodiments, the first half of the key may be used as the first part, and the second half of the key may be used as the second part. In some other embodiments, the second half of the key may be used as the first part, and the first half of the key may be used as the second part. The lengths of the first part and the second part may be the same or different. In some embodiments, during division of the key, a character string with a certain length may be divided according to a preset character string length value (that is, a preset quantity of characters included in a character string) to serve as the first part of the key, and then the rest of the character string is used as the second part of the key.

In step 204, the first client 101 may receive an authorization code corresponding to the encrypted data from the access authorization server 103.

In some embodiments, when receiving a first part of a key, which is uploaded by the first client 101, for a piece of encrypted data, the access authorization server 103 generates an authorization code for the piece of encrypted data, and then returns the authorization code to the first client 101. Specifically, the access authorization server 103 may generate the authorization code according to a rule corresponding to a user who uploads the piece of data.

In step 205, the first client 101 may transmit the authorization code and a second part of the key to another client of a user, for example, a second client 102, in a case that the user is authorized to access the encrypted data, the second part of the key including a remaining part in the key except the first part, so that in a case of transmitting an access request for the encrypted data to the access authorization server 103, the second client 102 may add the authorization code and the second part of the key to the access request.

In this way, the access authorization server 103 may generate the key according to the first part and the second part of the key when determining that the authorization code is valid, decrypts, according to the generated key, the encrypted data obtained from the block of the information sharing system 104, and provides the plaintext data obtained through decryption for the second client 102.

In some embodiments, when a user wants to view the encrypted data, the user may request an authorization code from the first client 101 by means of the second client 102 used by the user. When determining to authorize the user to view the data, the first client 101 may transmit the authorization code and the second part of the key to the second client 102.

In some embodiments, the access authorization server 103 may combine the first part and the second part of the key to form the complete key. If the second part of the key obtained by the access authorization server 103 from the second client 102 and the first part of the key obtained from the first client 101 do not belong to the same key, the two parts cannot be combined to form a correct key. Thus, when the decryption fails, the second client 102 cannot obtain the plaintext data. The access authorization server 103 may return a failure response or the encrypted data to the second client 102. As such, the second client 102 cannot view content of the data successfully. Accordingly, the security of the data uploaded by the first client 101 is ensured effectively.

By using the method provided in the foregoing embodiment, the first client 101 holds the key and the authorization code. The access authorization server 103 holds the authorization code and the first part of the key, and when authorized, the second client 102 can hold the second part of the key and the authorization code. In this way, when the second client 102 requests to access corresponding data through the access authorization server 103, the access authorization server 103 may first verify whether the authorization code is valid, and obtains the complete key by using the incomplete keys (the first part and the second part of the key) obtained from the first client 101 and the second client 102 in a case that the authorization code is valid. If the incomplete key provided by the second client 102 is invalid, the correct complete key cannot be obtained, and the encrypted data cannot be decrypted successfully, thus ensuring the security of the data. In this embodiment, the second client 102 and the access authorization server 103 each hold a part of the key, and neither of them may have the right to access the encrypted data. The complete key may be obtained only when the key information held by the second client 102 and the access authorization server 103 are combined, thus ensuring the data security and user privacy. In this way, for the encrypted data that is stored in the information sharing system 104, and if the user does not want to make it public, the first client 101 may authorize, through the access authorization server 103, some second clients 102 to access the plaintext of the encrypted data, thus achieving a balance between information sharing and privacy protection, and providing a better information sharing mechanism.

The foregoing embodiment may be applied in a data sharing scenario of a blockchain. The access authorization server 103 may provide a service of authorized viewing of private data, which may be an optional service for data privacy protection provided for a blockchain in the information sharing system. The service may be applied to scenarios, such as an information sharing blockchain and a digital asset blockchain, to protect data that a user does not want to make public and allow some users to view the data by means of independent authorization. The blockchain is based on the principle of sharing, and therefore, all users can view data on the blockchain freely. Here, whether a user is authorized or not, the user may view the data freely. However, only data viewed through the access authorization server 103 may be decrypted plaintext data. If a user directly views data on the blockchain, the user obtains encrypted data and cannot obtain the plaintext data.

In some embodiments, referring back to step 204, the first client 101 may further generate an access token or a data viewing token of the encrypted data after receiving the authorization code. The access token may include the authorization code and the second part of the key. In step 205, the step of transmitting the authorization code and the second part of the key to the second client 102 may specifically include transmitting the access token to the second client 102, so that the second client 102 adds the access token to the access request. As such, the first client 101 may transmit the authorization code and the second part of the key to the second client 102. Here, the authorization code and the key may be a character string formed by digits and/or characters. Similarly, the access token formed by the authorization code and the second part of the key may be a character string formed by digits and/or characters. In this embodiment, the first client 101 may issue a token to the second client 102 to authorize a corresponding user to access the encrypted data uploaded by the first client 101. Moreover, the issued token may not have a complete key. A verification may be further needed to access authorization server 103 to obtain the complete key to decrypt the data, thus ensuring data security effectively.

In some embodiments, referring back to step 202, when the encrypted data is uploaded to the information sharing system 104, the first client 101 may further upload a file identifier of the encrypted data and a user identifier of a holder of the encrypted data, which is usually an identifier of a user currently using the first client 101, so that the information sharing system 104 may associate the encrypted data with the file identifier and the user identifier of the holder. Accordingly, the access authorization server 103 may obtain the encrypted data from the information sharing system 104 according to the file identifier and the user identifier of the holder. Here, when a piece of encrypted data is uploaded, a file identifier and a user identifier of a holder may be uploaded to the information sharing system 104 at the same time. The information sharing system 104 may associate the encrypted data with the file identifier and the user identifier of the holder when storing the encrypted data. When querying a piece of encrypted data in the information sharing system 104, the access authorization server 103 may add the file identifier and the user identifier of the holder to a query request. In this way, the information sharing server 104 may determine encrypted data associated with the file identifier and the user identifier of the holder, and return the encrypted data to the access authorization server 103.

In some embodiments, referring back to in step 203, when the first part of the key is uploaded to the access authorization server 104, the first client 101 may further upload the file identifier and the user identifier of the holder, so that the access authorization server 103 generates the authorization code according to a rule corresponding to the user identifier of the holder, and associates the authorization code with the first part of the key, the file identifier, and the user identifier of the holder. When receiving the access request, the access authorization server 103 may obtain the associated authorization code and the first part of the key (which may be the authorization code and the first part of the key that correspond to the encrypted data maintained in the access authorization server 103 locally) according to the file identifier and the user identifier of the holder that are carried in the access request, so as to determine whether the authorization code carried in the access request is valid according to the obtained authorization code, and generate the key according to the obtained first part of the key and the second part carried in the access request.

In some embodiments, an authorization code generating rule for various users may be preconfigured in the access authorization server 103. The rule may specify a data address allowed to access corresponding to a generated authentication code, an expiration time of the generated authentication code, and the like. The data address may be a block height in a blockchain, a universal resource locator (URL) address, and the like. In some embodiments, in step 203, when the first client 101 uploads the first part of the key, the access authorization server 104 may determine, according to the simultaneously uploaded user identifier of the holder of the encrypted data, a rule for generating the authorization code. As such, when receiving the access request, the access authorization server 103 may locally find an authorization code, that is, the authorization code associated with the file identifier and the user identifier of the holder, corresponding to the encrypted data currently requested to be accessed. If the authorization code carried in the access request is the same as the locally found authorization code, it indicates that the authorization code carried in the access request is valid. Further, it may also be verified whether the authorization code has expired (for example, whether an expiration time has arrived or whether the authentication code is within a validity date), and/or it may be verified whether an address of the encrypted data currently requested to be accessed belongs to a data address allowed to be accessed corresponding to the authorization code. For example, in a blockchain scenario, it may be verified whether a block height of data currently requested to be viewed is a block height allowed to be accessed corresponding to the authorization code. As another example, in a photo sharing scenario, it may be verified whether an album folder currently requested to be viewed is a folder allowed to be accessed corresponding to the authorization code. When the verification succeeds, it may be determined that the authorization code is valid. In some embodiments in a blockchain scenario, the access request transmitted by the second client 102 may carry a file identifier of data to be viewed. The access authorization server 103 may determine, according to the file identifier, a block height where the data is located, thus verifying whether the determined block height of the data is a block height allowed to be accessed corresponding to the authorization code. In some other embodiments, the access request transmitted by the second client 102 may directly carry the block height of the data, and the access authorization server 103 may verify whether the block height carried in the access request is the block height allowed to be accessed corresponding to the authorization code.

When it is determined that the authorization code is valid, the obtained first part of the key associated with the file identifier and the user identifier of the holder may be combined with the second part of the key carried in the access request to form the complete key.

In some embodiments, in step 204, when the first client 101 receives the authorization code, an access token of the encrypted data, which may include the authorization code and the second part of the key, may further be generated, and the access token may be associated with the file identifier. In step 205, transmitting the authorization code and the second part of the key to the second client 102 may further include transmitting the access token associated with the file identifier to the second client 102, so that the second client 102 adds the access token to the access request.

Specifically, the first client 101 maintains one or more access tokens. Each piece of data uploaded by the first client 101 may correspond to an access token, that is, each file identifier may be associated with an access token. As such, when the second client 102 requests a data access authorization from the first client 101, if the first client 101 agrees to grant an authorization, the first client 101 may determine a corresponding access token, and issue the access token to the second client 102. The second client 102 may request an access authorization for a specific piece of data, or for a data set meeting a particular condition, or for all data. The first client 101 may transmit corresponding one or more access tokens to the second client 102.

In some embodiments, after step 204, the method may further include the first client 101 transmitting a cancellation request for the authorization code to the access authorization server 103, so that the access authorization server 103 invalidates the authorization code. At the same time, the first client 101 may also invalidate the local authorization code. A cancellation request for an authorization code may carry a corresponding file identifier. The access authorization server 103 may determine the corresponding authorization code according to the file identifier, thus invalidating the authorization code, for example, setting a state of the authorization code to be an invalid state or clearing the authorization code. The access authorization server 103 may return a response to the first client 101 after invalidating the authorization code. The first client 101 may invalidate the local authorization code when receiving the response, thus completing the process of canceling the authorization code.

In this way, the first client 101 not only can enable the access authorization server 103 to generate an authorization code for the uploaded data, but also can request the access authorization server 103 to cancel the authorization code. After the authorization code is canceled, if a second client 102 uses the authorization code or an access token including the authorization code when requesting to access the data, the authorization code may be verified as invalid. Thus, the access request may be rejected and the second client 102 may not access the data, or may only obtain encrypted data, but not the decrypted plaintext data. Therefore, a dynamic authorization manner for data access may be formed. Users sharing a piece of data may cancel a corresponding authorization code as required, so that a user, who obtains the authorization code originally and can access the data, can no longer access the data.

In some embodiments, after the authorization code for a piece of encrypted data is canceled, the first client 101 may further transmit an authorization code generating request for the encrypted data to the access authorization server 103, so that the access authorization server 103 generates a new authorization code corresponding to the encrypted data, and then the first client 101 may receive, from the access authorization server 103, the new authorization code corresponding to the encrypted data. As such, a user not only can cancel the authorization code at any time so that a previously authorized user cannot access the plaintext of the encrypted data, but also can request to generate a new authorization code, so as to re-authorize the user to access the plaintext of the encrypted data, thus implementing flexible data access authorization.

In some embodiments, after obtaining the authorization code, the first client 101 may further request the access authorization server 103 to update the authorization code. Here, the authorization code obtained by the first client 101 has not been deleted yet or has not been used. The first client 101 may transmit an authorization code updating request for a piece of encrypted data to the access authorization server 103, so that the access authorization server 103 generates a new authorization code corresponding to the encrypted data, and replaces the previous authorization code with the new authorization code. Subsequently, the first client 101 receives the new authorization code from the access authorization server 103, and replaces the previous authorization code with the new authorization code. Through this authorization code updating process, the first client 101 may cancel the previous authorization code, so that a previously authorized user cannot access the plaintext of the encrypted data. Moreover, the first client 101 may obtain a new authorization code to authorize additional users or authorize the same user again.

In some embodiments, the foregoing authorization code cancellation request, authorization code generating request, and authorization code updating request may coexist, and the user may choose to cancel the authorization code, generate a new authorization code, or update the authorization code as required, thus implementing an improved dynamic authorization solution.

According to an embodiment, there is provided a data sharing method, which may be performed by an access authorization server 103. The method may include the following steps.

In step 301, the method may include receiving a first part of a first key from a first client 101, the first key corresponding to a piece of encrypted data uploaded to a block of an information sharing system 104, the encrypted data being obtained by encrypting a piece of plaintext data according to the first key, and the information sharing system being a blockchain system.

In step 302, the method may include generating a first authorization code corresponding to the encrypted data.

In step 303, the method may include transmitting the first authorization code to the first client 101, so that the first client 101 transmits, in a case of authorizing a second client 102 to access the encrypted data, the first authorization code and a second part of the first key to the second client 102, so that the second client 102 adds the first authorization code and the second part of the first key to an access request in a case of accessing the encrypted data, the second part of the first key including a remaining part of the first key except the first part.

In step 304, the method may include performing the following steps in response to reception of an access request from any client, which may be the foregoing authorized second client 102 or another unauthorized client for the encrypted data.

In step 305, the method may include obtaining a second authorization code and an incomplete key from the access request.

In step 306, the method may include generating a second key according to the incomplete key and the first part of the first key corresponding to the encrypted data in a case that the second authorization code is the same as the first authorization code and the second authorization code is valid, the generated second key being the same as the first key given that the incomplete key is the same as the second part of the first key.

In step 307, the method may include obtaining the encrypted data from the block of the information sharing system 104, and decrypt the encrypted data according to the second key, the plaintext data being obtained through decryption and transmitted to the client that transmits the access request given that the second key is the same as the first key.

By using the method provided in the foregoing embodiment, the first client 101 may hold the key and the authorization code, the access authorization server 103 may hold the authorization code and the first part of the key. When authorized, the second client 102 may hold the second part of the key and the authorization code. As such, when another client (which may be the authorized second client 102 or another client) requests, through the access authorization server 103, to access corresponding data, the access authorization server 103 may first verify whether the authorization code is valid. In a case that the authorization code is valid, a complete key may be then obtained by using incomplete keys (the first part and the second part of the key) that are obtained from the first client 101 and another client, respectively. If the incomplete key provided by another client is problematic, the correct complete key cannot be obtained, and the encrypted data cannot be decrypted successfully.

This ensures data security. In this embodiment, the authorized second client 102 and the access authorization server 103 may each hold a part of the key, and neither of them may have the right to access the encrypted data. The complete key may be obtained only when the key information held by the authorized second client 102 and the access authorization server 103 is combined, thus effectively ensuring data security and data privacy. In this way, for the encrypted data that is stored in the information sharing system 104 and given that the user does not want to make the encrypted data public, the first client 101 may authorize, through the access authorization server 103, some second clients 102 to access the plaintext of the encrypted data, thus achieving a balance between information sharing and privacy protection, and providing a better information sharing mechanism.

In some embodiments, in step 305, the step of obtaining a second authorization code and an incomplete key from the access request may further include obtaining an access token of the encrypted data from the access request, and obtaining the second authorization code and the incomplete key from the access token.

In some embodiments, in step 301, when receiving the first part of the key from the first client, the access authorization server 103 may further receive a file identifier and a user identifier of a holder of the encrypted data. In step 302, the step of generating a first authorization code corresponding to the encrypted data may further include generating the authorization code according to a rule corresponding to the user identifier of the holder, and associating the authorization code with the first part of the key, the file identifier, and the user identifier of the holder, and obtaining, in response to reception of the access request, the associated authorization code and the first part of the key according to the file identifier and the user identifier of the holder that are carried in the access request.

In some embodiments, the block may correspond to a block height. In step 302, the generated first authorization code may correspond to a block height allowed to be accessed and/or an expiration time. In step 306, a block height allowed to be accessed and/or an expiration time corresponding to the second authorization code may be obtained in a case that the second authorization code is the same as the first authorization code. It may be determined that the second authorization code is valid in a case that a block height of the encrypted data corresponding to the access request matches the block height allowed to be accessed corresponding to the second authorization code and/or in a case that the expiration time of the second authorization code has not arrived yet.

In some embodiments, the method may further include invalidating the authorization code in response to a cancellation request from the first client 101. The access authorization server 103 may return a response to the first client 101 after invalidating the authorization code. When receiving the response, the first client 101 invalidates the local authorization code, thus completing the process of canceling the authorization code. Accordingly, a user may cancel an authorization code for some data or cancel sharing data with some users. For example, a second client 102 may obtain an authorization code for a piece of data in advance, and if the authorization code expires, the authorization code may be verified as invalid when the second client 102 uses the authorization code to request to access the data again. Therefore, the second client 102 cannot access the data.

In some embodiments, the method may further include generating a new authorization code corresponding to the encrypted data in response to an authorization code generating request from the first client 101 and transmitting the new authorization code corresponding to the encrypted data to the first client 101. In this way, after canceling an authorization code for a piece of data, the user may further request a new authorization code, so as to re-authorize some users to access the data, thus providing flexible data access authorization.

In some embodiments, the method may further include generating a new authorization code corresponding to the encrypted data in response to an authorization code updating request from the first client 101, replacing the previous first authorization code with the new authorization code, and transmitting the new authorization code corresponding to the encrypted data to the first client 101, so that the first client 101 replaces the previous first authorization code with the new authorization code.

Figure 4:
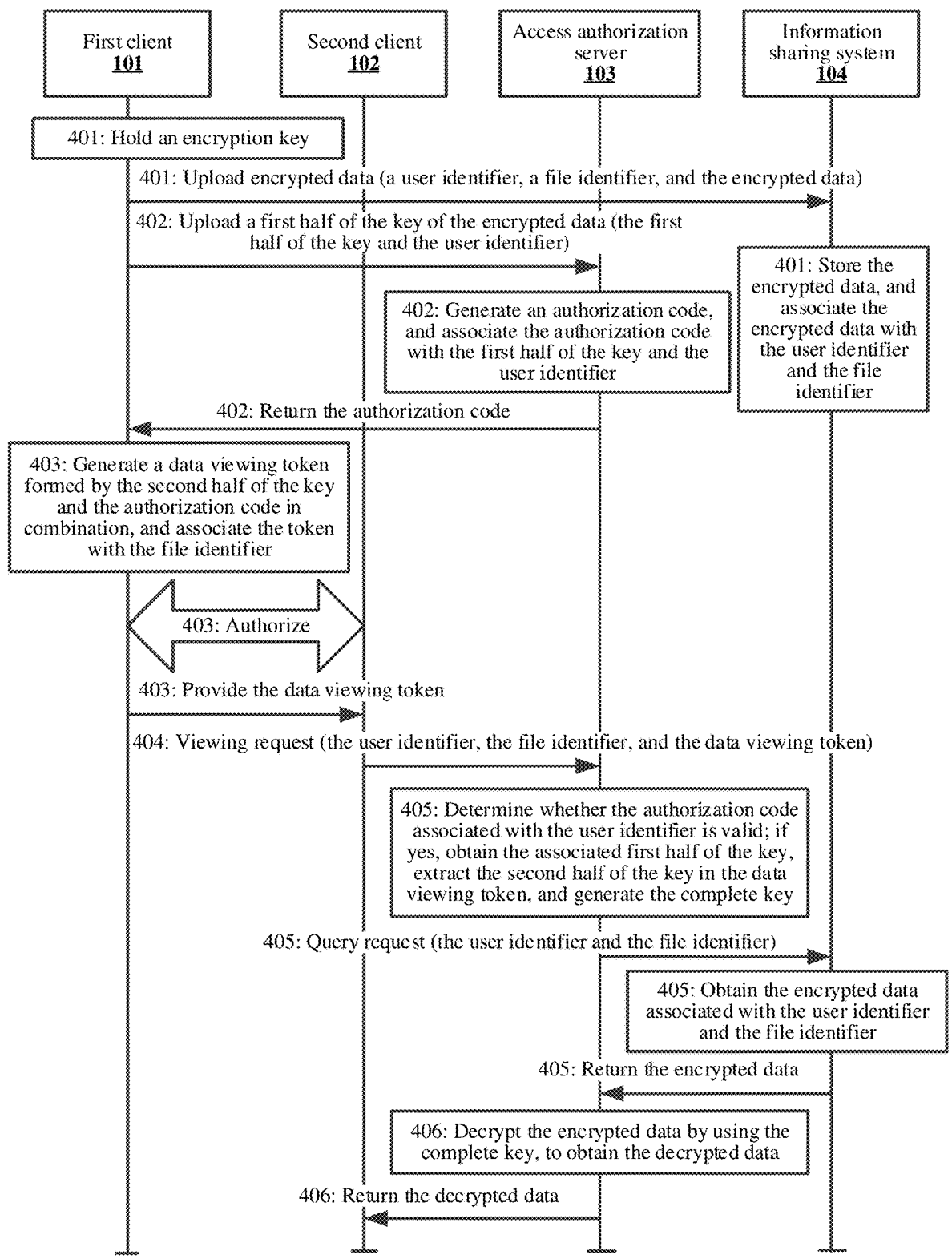
FIG. 4 is a schematic diagram of message interaction according to an embodiment.

FIG. 4 shows a message interaction process according to an embodiment. As shown in FIG. 4, the process at least relates to four entities: a first client 101, a second client 102, an access authorization server 103, and an information sharing system 104, and may include the following processing steps.

In step 401, the first client 101 may hold an encryption key, and encrypt data to be uploaded to the information sharing system 104 to obtain a piece of encrypted data.

The first client 101 may upload the encrypted data to the information sharing system 104. During the uploading of the encrypted data, a user identifier of a holder of the encrypted data and a file identifier that are associated with the encrypted data may be further transmitted to the information sharing system 104. For example, the first client 101 may transmit a data uploading request to the information sharing system 104, where the request carries the user identifier of the holder, the file identifier, and the encrypted data. The user identifier of the holder may be an identifier of a current login user of the first client 101, for example, a QQ number, a cloud disk account, or an account of a blockchain system. The file identifier may be used for identifying the encrypted data.

The information sharing system 104 may store the encrypted data uploaded by the first client 101, and associate the encrypted data with the user identifier of the holder and the file identifier, so as to store the encrypted data in a directory corresponding to the user identifier of the holder, and identify the encrypted data by using the file identifier.

Figure 5:
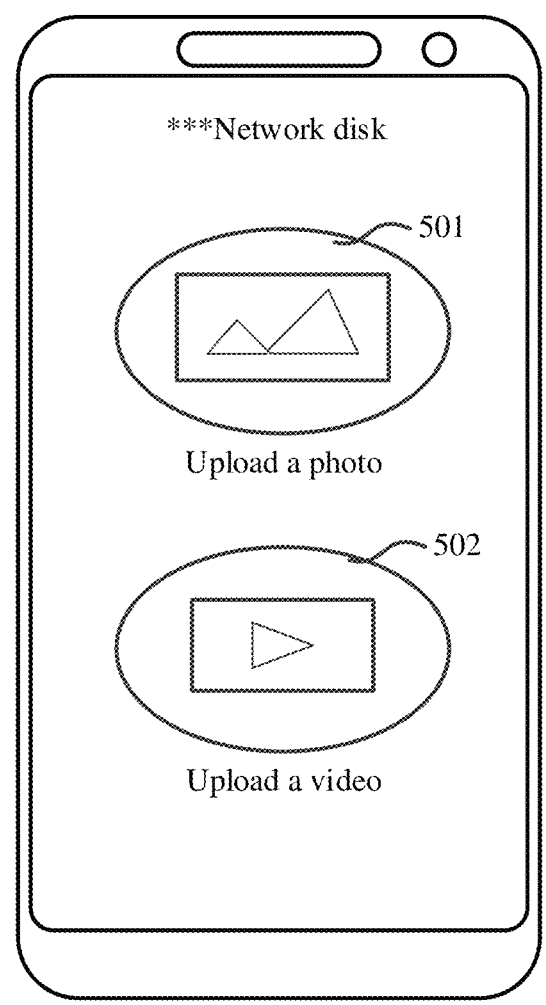
FIG. 5 is a schematic diagram of a user interface according to an embodiment.

In the scenario shown in FIG. 5, the first client 101 is a network disk client, and the information sharing system 104 is a network disk server in the cloud, or may be referred to as a cloud disk server. A user may upload files, such as photos and videos, by using the network disk client. For example, the user may upload a photo by clicking a control 501, and may upload a video by clicking a control 502. If the user wants to ensure the privacy of the uploaded photo and video, the network disk client may be configured to encrypt the data. In this way, the network disk client may perform the encryption processing in step 401.

In step 402, the first client 101 may upload, to the access authorization server 103, the first half of the key used for encryption in step 401, and may further transmit a user identifier of a holder associated with the encrypted data to the access authorization server. For example, the first client 101 may transmit a key uploading request to the access authorization server 103, where the request carries the user identifier of the holder of the encrypted data and the first half of the key.

The access authorization server 103 may generate an authorization code according to a rule corresponding to the user identifier of the holder, associate the authorization code with the first half of the key and the user identifier of the holder, and return the authorization code to the first client 101.

In step 403, the first client 101 may combine the second half of the key used for encryption in step 401 and the received authorization code to form a data viewing token, and associate the data viewing token with the file identifier of the encrypted data.

When authorizing the second client 102 to view plaintext data of the encrypted data, the first client 101 may provide the data viewing token to the second client 102. For example, the second client 102 may request, from the first client 101, a viewing authorization for a piece of data, and may transmit an authorization request carrying target file information to the first client 101. The first client 101 may determine, according to the target file information, a file identifier set corresponding to a data set that the second client 102 wants to view. The target file information may include a file identifier, or may be an identifier of a folder, a directory address, or the like. The first client 101 may determine the corresponding file identifier set, and further determine an associated data viewing token according to the file identifier set. Here, one file identifier set, which may include one or more file identifiers, may be associated with one data viewing token, representing that the first client 101 authorizes the second client 102 to view a file set in a batch. One file identifier set may also be associated with multiple data viewing tokens, where different file identifiers may be associated with different data viewing tokens, and the first client 101 may provide the second client 102 with the respective data viewing token corresponding to each file.

In step 404, the second client 102 may transmit a viewing request to the access authorization server 103 after holding the data viewing token, where the request carries the user identifier of the holder of the encrypted data, the file identifier, and the data viewing token.

Figure 6:
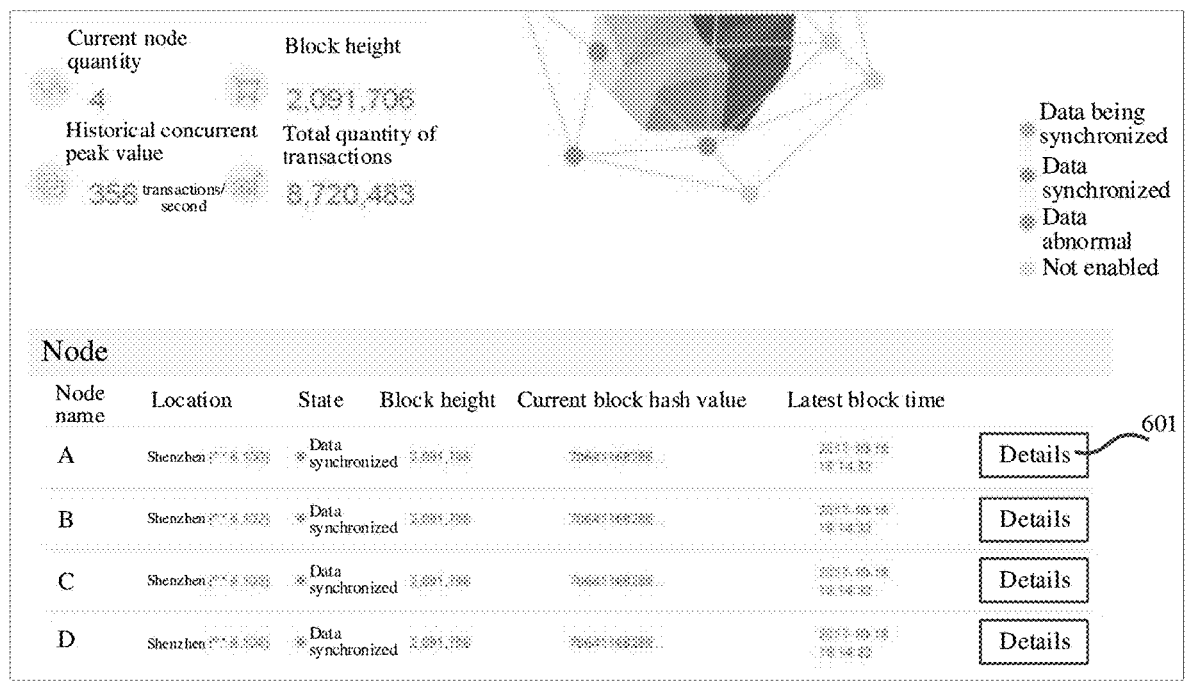
FIG. 6 is a schematic diagram of a user interface according to an embodiment.

In the scenario shown in FIG. 6, the second client 102 may be a browser for visiting a blockchain page. The information sharing system 104 may be blockchain system. A user may view different information by visiting the blockchain page. Some information may be set to private, and the user may view plaintext data only when the user has a data viewing token. For example, the user may click a control 601, and then step 404 may be performed to transmit a viewing request. If the data viewing token carried in the viewing request includes a correct valid authorization code and a correct second half of a key, the browser may display the second page of the plaintext data corresponding to a "details" option.

In step 405, the access authorization server 103 may extract the data viewing token, the user identifier of the holder, and the file identifier from the received viewing request, extract the authorization code from the data viewing token, and determine whether the authorization code is valid. Here, the operation of determining whether the authorization code is valid by the access authorization server 103 includes two aspects. In the first aspect, it is determined whether the authorization code extracted from the data viewing token is the same as a locally stored authorization code associated with the user identifier of the holder, and if the authorization code extracted from the data viewing token is the same as the authorization code found locally, it indicates that the authorization code carried in the data viewing token is valid. In the second aspect, if it is determined that the two authorization codes are the same, it is further verified whether the authorization code has expired, for example, whether an expiration time of the authorization code has arrived or whether the authorization code is still within a validity date, and/or it is verified whether an address of the encrypted data currently requested to be accessed belongs to a data address allowed to be accessed corresponding to the authorization code.

If it is determined that the authorization code is valid, the access authorization server 103 may obtain the first half of the key associated with the authorization code, extract the second half of the key from the data viewing token, and combine the first half of the key and the second half of the key to form a complete key.

The access authorization server 103 may further transmit a query request to the information sharing system 104, where the request carries the user identifier of the holder and the file identifier, so that the information sharing server 104 finds the associated encrypted data according to the user identifier of the holder and the file identifier, and returns the encrypted data to the access authorization server 103.

In step 406, the access authorization server 103 may decrypt the encrypted data by using the complete key obtained in step 405. If the second half of the key extracted from the data viewing token is correct, a correct complete key may be obtained in step 405. In this step, decrypted data, that is, plaintext data may be obtained through decryption successfully, and the decrypted data may be transmitted to the second client 102. If the second half of the key extracted from the data viewing token is incorrect, the key obtained in step 405 is incorrect, and decryption cannot be performed. In this case, an error may be reported to the second client 102, or a piece of encrypted data may be returned to the second client 102 directly. In other words, the second client 102 cannot view the plaintext data successfully, thus ensuring security of the data uploaded by the first client 101.

When any of the foregoing steps fail, the process may be ended.

Figure 7:
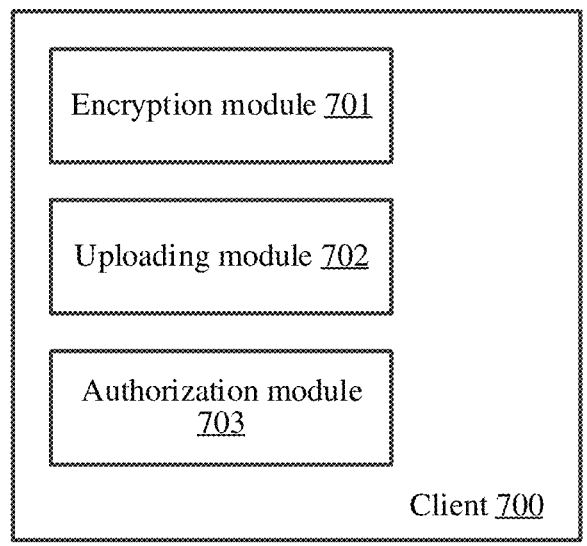
FIG. 7 is a schematic structural diagram of a client according to an embodiment.

Based on the foregoing method, an embodiment of the present disclosure further provides at least one client that may implement the foregoing method. As shown in FIG. 7, a first client 700 may include the following modules: an encryption module 701 configured to encrypt a piece of plaintext data according to a key to obtain a piece of encrypted data; an uploading module 702 configured to upload the encrypted data to a block of an information sharing system 104, the information sharing system being a blockchain system, and upload a first part of the key to an access authorization server 103 corresponding to the information sharing system 104; and an authorization module 703 configured to receive, from the access authorization server 103, an authorization code corresponding to the encrypted data, and transmit the authorization code and a second part of the key to a second client 102 in a case that a user is authorized to access the encrypted data, the second part of the key including a remaining part of the key except the first part, so that in a case of transmitting an access request for the encrypted data to the access authorization server, the second client 102 adds the authorization code and the second part of the key to the access request, and the access authorization server 103 generates the key according to the first part and the second part of the key in a case of determining that the authorization code is valid, decrypts, according to the generated key, the encrypted data obtained from the block of the information sharing system 104 to obtain the plaintext data, and transmits the encrypted data to the second client 102.

In some embodiments, the authorization module 703 may be further configured to generate an access token of the encrypted data, the access token including the authorization code and the second part of the key, and transmit the access token to the second client 102, so that the second client 102 adds the access token to the access request.

In some embodiments, in a case that the encrypted data is uploaded to the information sharing system 104, the uploading module 702 may further upload a file identifier of the encrypted data and a user identifier of a holder of the encrypted data, so that the information sharing system 104 associates the encrypted data with the file identifier and the user identifier of the holder. Accordingly, the access authorization server 103 may obtain the encrypted data from the information sharing system 104 according to the file identifier and the user identifier of the holder.

In some embodiments, in a case that the first part of the key is uploaded to the access authorization server 103, the uploading module 702 may further upload the file identifier and the user identifier of the holder, so that the access authorization server 103 generates the authorization code according to a rule corresponding to the user identifier of the holder. The access authorization server 103 associates the generated authorization code with the first part of the key, the file identifier, and the user identifier of the holder, and obtains, in response to reception of the access request, the associated authorization code and the first part of the key according to the file identifier and the user identifier of the first part that are carried in the access request, so as to determine, according to the obtained authorization code, whether the authorization code carried in the access request is valid, and generate the key according to the first part of the key and the second part carried in the access request.

In some embodiments, the authorization module 703 may further generate an access token for the encrypted data, the access token including the authorization code and the second part of the key, and associate the access token with the file identifier. The authorization module 703 may transmit the access token associated with the file identifier to the second client 102, so that the second client 102 may add the access token to the access request.

In some embodiments, the authorization module 703 may further transmit a cancellation request for the authorization code to the access authorization server 103, so that the access authorization server 103 may invalidate the authorization code. The authorization module 703 may further invalidate the local authorization code.

In some embodiments, the authorization module 703 may further transmit an authorization code generating request for the encrypted data to the access authorization server 103, so that the access authorization server 103 may generate a new authorization code corresponding to the encrypted data. The authorization module 703 may further receive, from the access authorization server 103, the new authorization code corresponding to the encrypted data.

In some embodiments, the authorization module 703 may further transmit an authorization code updating request for the encrypted data to the access authorization server 103, so that the access authorization server 103 generates a new authorization code corresponding to the encrypted data, and may replace the previous authorization code with the new authorization code. The authorization module 703 may further receive the new authorization code from the access authorization server 103, and replace the previous authorization code with the new authorization code.

Figure 8:
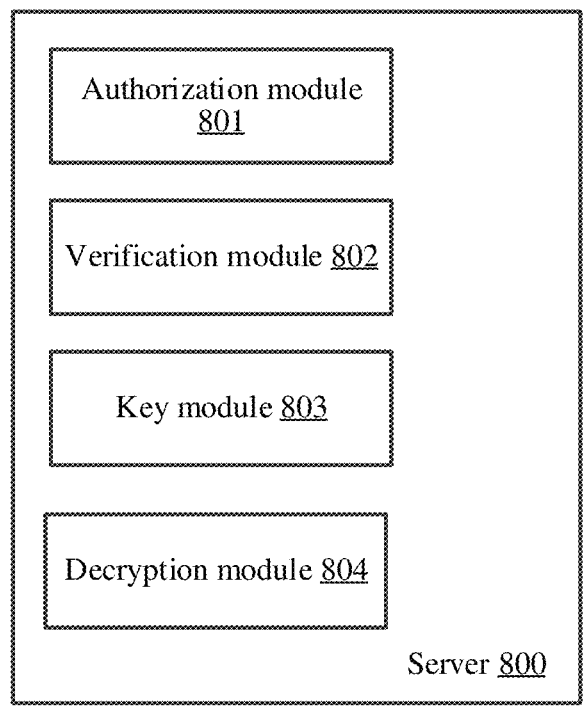
FIG. 8 is a schematic structural diagram of a server according to an embodiment.

Based on the foregoing method, an embodiment of the present disclosure may further provide an access authorization server that may implement the foregoing method. As shown in FIG. 8, the server 800 may include the following modules: an authorization module 801 configured to receive a first part of a first key from a first client 101, the first key corresponding to a piece of encrypted data uploaded to a block of an information sharing system 104, the encrypted data being obtained by encrypting a piece of plaintext data according to the first key, and the information sharing system being a blockchain system; generate a first authorization code corresponding to the encrypted data, and transmit the first authorization code to the first client 101, so that the first client 101 transmits, in a case of authorizing a second client 102 to access the encrypted data, the first authorization code and a second part of the first key to the second client 102, so that the second client 102 may add the first authorization code and the second part of the first key to an access request in a case of accessing the encrypted data, the second part of the first key including a remaining part of the first key except the first part; a verification module 802 configured to, in response to reception of an access request from any client for the encrypted data, obtain a second authorization code and an incomplete key from the access request and trigger a key module 803 in a case that the second authorization code is the same as the first authorization code and the second authorization code is valid; the key module 803 configured to generate a second key according to the incomplete key and the first part of the first key corresponding to the encrypted data, the generated second key being the same as the first key in a case that the incomplete key is the same as the second part of the first key; and a decryption module 804 configured to obtain the encrypted data from the block of the information sharing system 104, and decrypt the encrypted data according to the second key, the plaintext data being obtained through decryption and transmitted to the client that transmits the access request in a case that the second key is the same as the first key.

In some embodiments, the verification module 802 may obtain an access token of the encrypted data from the access request, and obtain the second authorization code and the incomplete key from the access token.

In some embodiments, the authorization module 801 may further receive a file identifier and a user identifier of a holder of the encrypted data when receiving the first part of the key from the first client 101. The authorization module 801 may generate the first authorization code according to a rule corresponding to the user identifier of the holder, and associate the first authorization code with the first part of the key, the file identifier, and the user identifier of the holder. The verification module 802 may obtain, in response to reception of the access request, the associated first authorization code and the first part of the key according to the file identifier and the user identifier of the holder that are carried in the access request.

In some embodiments, the block may correspond to a block height. The first authorization code generated by the authorization module 801 may correspond to a block height allowed to be accessed and/or an expiration time. The verification module 802 may obtain a block height allowed to be accessed and/or an expiration time corresponding to the second authorization code in a case that the second authorization code is the same as the first authorization code, and may determine that the second authorization code is valid in a case that a block height of the encrypted data corresponding to the access request matches the block height allowed to be accessed corresponding to the second authorization code and/or in a case that the expiration time of the second authorization code has not arrived yet.

In some embodiments, the authorization module 801 may further invalidate the first authorization code in response to a cancellation request from the first client 101 and return a response to the first client 101, so that the first client 101 invalidates the local first authorization code.

In some embodiments, the authorization module 801 may further generate a new authorization code corresponding to the encrypted data in response to an authorization code generating request from the first client 101, and transmit the new authorization code corresponding to the encrypted data to the first client 101.

In some embodiments, the authorization module 801 may further generate a new authorization code corresponding to the encrypted data in response to an authorization code updating request from the first client 101, replace the previous first authorization code with the new authorization code, and transmit the new authorization code corresponding to the encrypted data to the first client 101, so that the first client 101 may replace the previous first authorization code with the new authorization code.

In some embodiments, the foregoing client 700 and server 800 may run in various computing devices, and may be loaded in a memory of the computing device. According to an embodiment, there is provided a computing device, including one or more processors, a memory, and one or more programs that are stored in the memory and configured to be performed by the one or more processors, the one or more programs including instructions for performing any of the foregoing embodiments.

Figure 9:
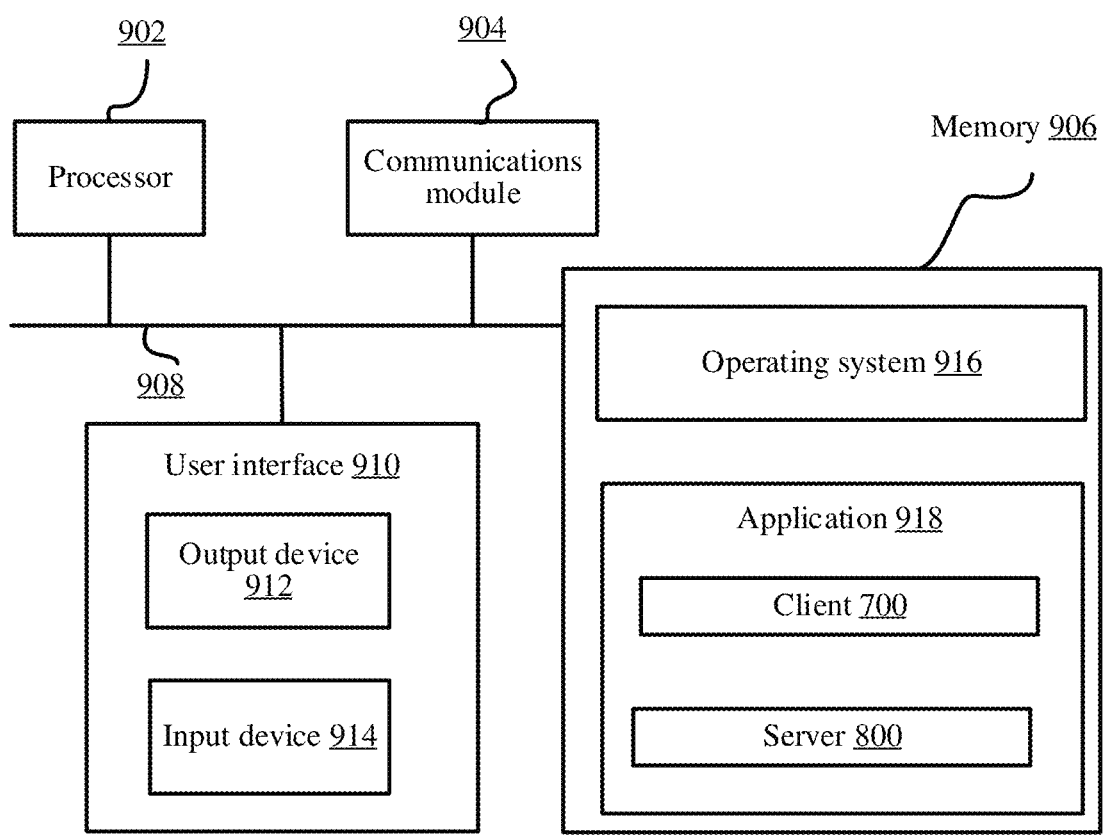
FIG. 9 is a schematic structural diagram of composition of a computing device according to an embodiment.

FIG. 9 is a structural diagram of composition of a computing device where the client 700 or the server 800 is implemented. As shown in FIG. 9, the computing device may include one or more processors (CPU) 902, a communications module 904, a memory 906, a user interface 910, and a communications bus 908 configured to interconnect the components.

The processor 902 may receive and transmit data through the communications module 904, so as to implement network communication and/or local communication.

The user interface 910 may include one or more output devices, including one or more speakers and/or one or more visual displays. The user interface may also include one or more input devices 914, including, for example, a keyboard, a mouse, a voice command input unit or a loudspeaker, a touch display, a touch-sensitive input tablet, a gesture capture camera, or another input button or control.

The memory 906 may be a high-speed random access memory, such as a DRAM, a SRAM, a DDR RAM, or another random access solid-state storage device. The memory 906 may also include a non-volatile memory, for example, one or more magnetic disk storage devices, an optical disc storage device, a flash memory device, or another non-volatile solid-state storage device.

The memory 906 may store an instruction set that may be executed by the processor 902, including an operating system 916 including a program for processing various basic system services and for performing hardware-related tasks; and an application 918 including various application programs that may implement the processing procedure in the foregoing embodiments, which may include, for example, the client 700 shown in FIG. 7 and/or the server 800 shown in FIG. 8.

In some embodiments, the client 700 may include some or all of the modules 701 to 703 shown in FIG. 7, and the modules 701 to 703 may store machine executable instructions. The processor 902 may implement the functions of the foregoing modules 701 to 703 by executing the machine executable instructions of the modules 701 to 703 stored in the memory 906. In some embodiments, the server 800 may include some or all of the modules 801 to 804 shown in FIG. 8, and the modules 801 to 804 may store machine executable instructions. The processor 902 may implement the functions of the foregoing modules 801 to 804 by executing the machine executable instructions in the modules 801 to 804 stored in the memory 906.

By using the client, the server, and the computing device provided in the foregoing embodiments, the first client 101 holds the key and the authorization code; the access authorization server 103 holds the authorization code and the first part of the key; when authorized, the second client 102 can hold the second part of the key and the authorization code. In this case, when the second client 102 requests to access corresponding data through the access authorization server 103, the access authorization server 103 may first verify whether the authorization code is valid, and obtains the complete key by using the incomplete keys (the first part and the second part of the key) obtained from the first client 101 and the second client 102 in a case that the authorization code is valid. If the incomplete key provided by the second client 102 is invalid, the correct complete key cannot be obtained, and the encrypted data cannot be decrypted successfully, thus ensuring the security of the data. In this embodiment, the second client 102 and the access authorization server 103 each hold a part of the key, and neither of them may have the right to access the encrypted data. The complete key can be obtained only when the key information held by the second client 102 and the access authorization server 103 is combined, thus ensuring the data security and user privacy.

Not all steps and modules in the foregoing processes and structural diagrams are necessary, and some steps or modules may be ignored according to actual requirements. The execution sequence of the steps are not fixed, but may be adjusted as required. The division of the modules is merely for describing the used functional division conveniently. During actual implementation, one module may be implemented by multiple modules, and functions of multiple modules may also be implemented by the same module. The modules may be located in the same device, or may be located in different devices.

Hardware modules in the embodiments may be implemented by hardware or by a hardware platform with software. The software may include machine readable instructions, and may be stored in a non-volatile storage medium. Therefore, the embodiments may also be embodied as a software product.

In the embodiments, the hardware may be implemented by dedicated hardware or hardware that executes machine readable instructions. For example, the hardware may be a specially designed permanent circuit or logic device, such as an FPGA or an ASIC, configured to complete a particular operation. The hardware may also include a programmable logic device or circuit, such as a general purpose processor or another programmable processor, that is temporarily configured in the software and configured to perform a particular operation.

In addition, each embodiment of the present disclosure may be implemented by a data processing program executed by a data processing device, such as a computer. Apparently, the data processing program may be used in the present disclosure. In addition, the data processing program generally stored in a storage medium may be executed in the following manner: directly reading the program from the storage medium or installing or duplicating the program to a storage device, such as a hard disk or a memory, of the data processing device. Therefore, such a storage medium may also be used in the present disclosure. An embodiment of the present disclosure further provides a non-volatile storage medium, which may store a data processing program. The data processing program may be configured to execute any embodiment in the foregoing embodiments of the present disclosure.

The machine readable instructions corresponding to the modules in FIG. 7 and FIG. 8 may enable an operating system operating on a computer to complete all or some of operations described herein. The non-volatile computer readable storage medium may be inserted into a memory disposed in an expansion board in a computer, or written into a memory disposed in an expansion unit connected to the computer. A CPU and the like installed on the expansion board or the expansion unit may perform some or all of actual operations according to the instructions.

The non-volatile computer readable storage medium includes a floppy disk, a hard disk, a magneto-optical disk, an optical disc (such as a CD-ROM, a CD-R, a CD-RW, a DVD-ROM, a DVD-RAM, a DVD-RW or a DVD+RW), a magnetic tape, a non-volatile memory card, and a ROM. Furthermore, program code may be downloaded by a communications network from a server computer.

In conclusion, the scope of the claims is not to be limited to the implementations in the embodiments described above, and the present disclosure is to be interpreted in a broadest sense as a whole.

What is claimed is:

1. A data sharing method, performed by an access authorization server, the method comprising:
receiving a first part of a first key from a first client, the first key corresponding to encrypted data uploaded to a block of an information sharing system, the encrypted data being obtained by encrypting a piece of plaintext data according to the first key, and the information sharing system being a blockchain system;
generating a first authorization code corresponding to the encrypted data;
transmitting the first authorization code to the first client;
based on receiving an access request from a second client for the encrypted data, obtaining a second authorization code and an incomplete key from the access request;
based on the second authorization code being the same as the first authorization code and the second authorization code being valid, generating a second key according to the incomplete key and the first part of the first key corresponding to the encrypted data, the generated second key being the same as the first key and the incomplete key being the same as the second part of the first key;
obtaining the encrypted data from the block of the information sharing system;
decrypting the encrypted data according to the second key to obtain the plaintext data; and
transmitting, to the second client, the decrypted plaintext data.

2. The method according to claim 1, wherein the receiving the first part of the key from the first client further comprises receiving a file identifier and a user identifier of a holder of the encrypted data; and
wherein the generating the first authorization code corresponding to the encrypted data further comprises:
generating the first authorization code according to a rule corresponding to the user identifier of the holder, and associating the first authorization code with the first part of the key, the file identifier, and the user identifier of the holder; and
obtaining, in response to receiving the access request, the associated first authorization code and the first part of the key according to the file identifier and the user identifier of the holder that are carried in the access request.

3. The method according to claim 1, wherein the block corresponds to a block height, and the generated first authorization code corresponds to at least one of the block height allowed to be accessed and an expiration time;
based on the second authorization being the same as the first authorization code, obtaining at least one of a block height allowed to be accessed and an expiration time corresponding to the second authorization code; and
determining whether the second authorization code is valid based on the block height of the encrypted data corresponding to the access request matching the block height of the second authorization code or the expiration time of the second authorization code not being lapsed.

4. The method according to claim 1, further comprising:
invalidating the first authorization code in response to a cancellation request from the first client; and
returning a response to the first client, so that the first client invalidates a local first authorization code.

5. The method according to claim 1, further comprising:
generating a new authorization code corresponding to the encrypted data in response to an authorization code generating request from the first client; and
transmitting the new authorization code corresponding to the encrypted data to the first client.

6. The method according to claim 1, further comprising:
generating a new authorization code corresponding to the encrypted data in response to an authorization code updating request from the first client, and replacing the first authorization code with the new authorization code; and
transmitting the new authorization code corresponding to the encrypted data to the first client, so that the first client replaces the first authorization code with the new authorization code.

7. The method according to claim 3, wherein, based on determining that the second authorization code is invalid, the encrypted data is not decrypted by the access authorization server.

8. The method according to claim 1, wherein, based on the first client authorizing the second client to access the encrypted data, the second client receives the first authorization code and the second part of the key, and transmits the access request for the encrypted data to the access authorization server, the access request including the second authorization code and the second part of the key.

9. An access authorization server, comprising:
at least one memory configured to store computer program code; and
at least one processor configured to access the computer program code and operate as instructed by the computer program code, the computer program code comprising:
authorization code configured to cause the at least one processor to:
receive a first part of a first key from a first client, the first key corresponding to encrypted data uploaded to a block of an information sharing system, the encrypted data being obtained by encrypting a piece of plaintext data according to the first key, and the information sharing system being a blockchain system;
    generate a first authorization code corresponding to the encrypted data; and
    transmit the first authorization code to the first client;
verification code configured to, based on receiving an access request from a second client for the encrypted data, obtain a second authorization code and an incomplete key from the access request;
key code configured to cause the at least one processor to, based on the second authorization code being the same as the first authorization code and the second authorization code being valid, generate a second key according to the incomplete key and the first part of the first key corresponding to the encrypted data, the generated second key being the same as the first key and the incomplete key being the same as the second part of the first key; and
decryption code configured to cause the at least one processor to obtain the encrypted data from the block of the information sharing system, decrypt the encrypted data according to the second key to obtain the plaintext data, and transmit, to the second client, the decrypted plaintext data.

10. The access authorization server according to claim 9, wherein the authorization code is further configured to cause the at least one processor to:
    generate the first authorization code according to a rule corresponding to the user identifier of the holder, and associating the first authorization code with the first part of the key, the file identifier, and the user identifier of the holder; and
    obtain, in response to receiving the access request, the associated first authorization code and the first part of the key according to the file identifier and the use identifier of the holder that are carried in the access request.

11. The access authorization server according to claim 9, wherein the authorization code is further configured to cause the at least one processor to:
    invalidate the first authorization code in response to a cancellation request from the first client; and
    returning a response to the first client, so that the first client invalidates a local first authorization code.

12. The access authorization server according to claim 9, wherein the authorization code is further configured to cause the at least one processor to:
    generate a new authorization code corresponding to the encrypted data in response to an authorization code generating request from the first client; and
    transmit the new authorization code corresponding to the encrypted data to the first client.

13. The access authorization server according to claim 9, wherein the authorization code is further configured to cause the at least one processor to:
    generate a new authorization code corresponding to the encrypted data in response to an authorization code updating request from the first client, and replacing the first authorization code with the new authorization code; and
    transmit the new authorization code corresponding to the encrypted data to the first client, so that the first client replaces the first authorization code with the new authorization code.

14. The method according to claim 9, wherein the second client is a browser for visiting a blockchain page.

15. A non-transitory computer readable storage medium, storing executable instructions, the executable instructions capable of causing a computer to:
    receive a first part of a first key from a first client, the first key corresponding to encrypted data uploaded to a block of an information sharing system, the encrypted data being obtained by encrypting a piece of plaintext data according to the first key, and the information sharing system being a blockchain system;
    generate a first authorization code corresponding to the encrypted data;
    transmit the first authorization code to the first client;
    based on receiving an access request from a second client for the encrypted data, obtain a second authorization code and an incomplete key from the access request;
    based on the second authorization code being the same as the first authorization code and the second authorization code being valid, generate a second key according to the incomplete key and the first part of the first key corresponding to the encrypted data, the generated second key being the same as the first key and the incomplete key being the same as the second part of the first key;
    obtain the encrypted data from the block of the information sharing system;
    decrypt the encrypted data according to the second key to obtain the plaintext data; and
    transmit, to the second client, the decrypted plaintext data.

16. The non-transitory computer-readable storage medium according to claim 15, wherein the receiving the first part of the first key from the first client further comprises receiving a file identifier and a user identifier of a holder of the encrypted data; and
    wherein the generating the first authorization code corresponding to the encrypted data further comprises:
    generating the first authorization code according to a rule corresponding to the user identifier of the holder, and associating the first authorization code with the first part of the key, the file identifier, and the user identifier of the holder; and
    obtaining, in response to receiving the access request, the associated first authorization code and the first part of the key according to the file identifier and the user identifier of the holder that are carried in the access request.

17. The non-transitory computer-readable storage medium according to claim 15, wherein the block corresponds to a block height, and the generated first authorization code corresponds to at least one of the block height allowed to be accessed and an expiration time, and
    wherein the executable instructions are further capable of causing the computer to:
    based on the second authorization being the same as the first authorization code, obtain at least one of a block height allowed to be accessed and an expiration time corresponding to the second authorization code; and
    determine whether the second authorization code is valid based on the block height of the encrypted data corresponding to the access request matching the block height of the second authorization code or the expiration time of the second authorization code not being lapsed.

18. The non-transitory computer-readable storage medium according to claim 15, wherein the executable instructions are further capable of causing the computer to:

invalidate the first authorization code in response to a cancellation request from the first client; and return a response to the first client, so that the first client invalidates a local first authorization code.

19. The non-transitory computer-readable storage medium according to claim 15, wherein the executable instructions are further capable of causing the computer to:

generate a new authorization code corresponding to the encrypted data in response to an authorization code generating request from the first client; and transmit the new authorization code corresponding to the encrypted data to the first client.

20. The non-transitory computer-readable storage medium according to claim 15, wherein the executable instructions are further capable of causing the computer to:

generate a new authorization code corresponding to the encrypted data in response to an authorization code updating request from the first client, and replace the first authorization code with the new authorization code; and transmit the new authorization code corresponding to the encrypted data to the first client, so that the first client replaces the first authorization code with the new authorization code.

* * * * *